US006938001B2

(12) United States Patent
Kimmel, Jr.

(10) Patent No.: US 6,938,001 B2
(45) Date of Patent: Aug. 30, 2005

(54) ELECTRONIC LEGAL RESEARCH ORDERING AND PRICING METHOD OF DEFINING AND VALUING ELECTRONIC LEGAL RESEARCH INSTRUCTIONS AND ELECTRONICALLY ORDERING AND PRICING LEGAL RESEARCH

(76) Inventor: James P. Kimmel, Jr., 832 Meadowview Dr., Kennett Square, PA (US) 19348

( * ) Notice: Subject to any disclaimer, the term of this patent is extended or adjusted under 35 U.S.C. 154(b) by 621 days.

(21) Appl. No.: 09/879,224

(22) Filed: Jun. 12, 2001

(65) Prior Publication Data

US 2002/0188521 A1 Dec. 12, 2002

Related U.S. Application Data

(60) Provisional application No. 60/275,314, filed on Mar. 14, 2001.

(51) Int. Cl.[7] .............................................. G06F 17/60
(52) U.S. Cl. ....................................................... 705/26
(58) Field of Search ............................. 705/26, 27, 25

(56) References Cited

U.S. PATENT DOCUMENTS 5,862,223 A  *  1/1999  Walker et al. ................ 705/50
2002/0099679 A1  *  7/2002  Usitalo et al. ................ 706/46

FOREIGN PATENT DOCUMENTS

KR           2002022825 A  *  9/2000  ........... G06F/19/00

OTHER PUBLICATIONS

Peter Sinton, "Two Attorneys Hang Their Shingles Online", San Francisco Chronicle, San Francisco, Calif.: Aug. 2, 2000.*

* cited by examiner

Primary Examiner—Jeffrey A. Smith
Assistant Examiner—Matthew S Gart (57) ABSTRACT

Apparatus and method for standardizing and automating the assignment, valuation, pricing and purchasing of legal research projects, whereby standardized legal research instructions and specifications to be stored in a database are defined by essential primary, sub and specific legal research instructions and specifications, to which numerical complexity values are assigned, and to which price ranges are assigned. This data is received from a legal research provider and stored in databases within an electronic legal research ordering and pricing server by a parameter definition section. The server receives and processes legal research orders based upon the specified legal research instructions and specifications selected by a purchaser. A price calculation section tracks the instructions, specifications and options selected by a purchaser, calculates their related values and corresponding prices based upon those values and delivery prices to arrive at a final order price. The system includes a network and may include a web site.

9 Claims, 9 Drawing Sheets

STANDARDIZED LEGAL RESEARCH
INSTRUCTIONS AND SPECIFICATIONS
WITH SAMPLE COMPLEXITY VALUES

| Sample Standardized Instructions/Specifications | Sample Stored Complexity Values |
|---|---|
| TYPE OF ANALYSIS [*Primary Instruction*] | |
| ☐ Case Law Analysis [*Sub Instruction*] | 1 |
| ☐ Statutory Analysis | 5 |
| ☐ Regulatory Analysis | 8 |
| ☐ Judicial/Evidentiary Analysis | 3 |
| | |
| CONTROLLING LAW [*Primary Instruction*] | |
| Federal | |
| ☐ Constitution [*Sub Instruction*] | 8 |
| ☐ Statutes | 3 |
| ☐ Regulations | |
| ☐ Judicial Rules | [and so on...] |
| ☐ Common Law | |
| ☐ Tribunals | |
|     o Supreme Court [*Specific Instruction*] | |
|     o Courts of Appeals [*Specific Instruction*] | |
|         ■ 1$^{st}$ Cir | |
|         ■ 2$^{nd}$ Cir | |
|         [other courts of appeals . . .] | |
|     o District Courts | |
|         ■ AK | |
|         ■ AL | |
|         [other district courts . . .] | |
|     o Bankruptcy Court | |
|     o Other ______________ | |
| States And Territories | |
| ☐ Constitution | |
| ☐ Statutes | |
| ☐ Regulations | |
| ☐ Judicial Rules | |
| ☐ Common Law | |
| ☐ Specific States/Territories | |
|     o AK | |
|     o AL | |
|     o AR | |
|     [other states and territories . . .] | |

FIG. 6a

FORUM
- Federal Tribunals
  - Courts of Appeals
    - 1st Cir
    - 2nd Cir
    - [other courts of appeals . . .]
  - District Courts
    - AK
    - AL
    - [other district courts . . .]
  - Bankruptcy Court
  - Other _____________

States And Territories
- Highest Court
- Intermediate Appellate Court
- Trial Court
- Other
- Specific States/Territories
  - AK
  - AL
  - AR
  - [other states and territories . . .]

SOURCES OF LAW
Federal
- Constitution
- Statutes
- Legislative History
- Regulatory: Name Agency: _________
  - Code of Federal Regulations
  - Federal Register
  - Administrative Materials
- Judicial Rules
  - Civil Procedure
  - Criminal Procedure
  - Appellate Procedure
  - Evidence
  - Local Rules: Name Court ______
- Cases
  - All Federal Cases
  - Supreme Court
  - Courts of Appeals
    - All Courts of Appeals
    - 1st Cir
    - 2nd Cir
    - [other courts of appeals . . .]

FIG. 6b

- o District Courts
  - All District Courts
  - AK
  - AL
  - AR
- o Court of Claims
- o Bankruptcy Court
- o Other

States And Territories
- Constitution
- Statutes
- Legislative History
- Regulatory
  - o Reulations: Name Agency
  - o Administrative Opinions/Miscellaneous Sources
- Judicial Rules
  - o Civil Procedure
  - o Criminal Procedure
  - o Appellate Procedure
  - o Evidence
- Cases
  - o Highest Court
  - o Intermediate Court
  - o Trial Court
  - o Other Court
- States/Territories
  - o All States/Territories
  - o AK
  - o AL
  - o AR
  - o [other states and territories . . .]

Other Sources
- Treatises
- Law Review Articles
- ALR
- Legal Encyclopedias

FIG. 6c

SUBJECT MATTER
Procedural
- Pretrial-Civil
- Discovery-Civil
- Pretrial-Criminal
- Discovery-Criminal
- Temporary/Preliminary Injunctions
- Evidence
- Post-trial motions
- Collection of Judgments
- Habeas/writs-Criminal
- Appellate

Substantive
- Antitrust
- Bankruptcy
- Contracts/Commercial Law
- Constitutional/Civil Rights
- Corporations/Business Organizations
- Criminal Law
- Employment/Labor
- Employee Benefits/Pensions
- Environmental
- Estates/Trusts
- Family Law
- Health Care
- Immigration
- Insurance
- Intellectual Property
- International
- Legal Ethics/Professional Responsibility
- Real Property
- Securities
- Taxation
- Business torts (fraud, interference with contract, etc.)
- Defamation
- Personal Torts (personal injury, product liability, negligence, assault, etc.)
- Property torts (trespass, conversion, nuisance, etc.)

FIG. 6d

ELECTRONIC LEGAL RESEARCH ORDERING AND PRICING METHOD OF DEFINING AND VALUING ELECTRONIC LEGAL RESEARCH INSTRUCTIONS AND ELECTRONICALLY ORDERING AND PRICING LEGAL RESEARCH

CROSS-REFERENCE TO PROVISIONAL APPLICATION

This Non-Provisional Application for Patent claims the benefit of Provisional Application for Patent No. 60/275,314, filed Mar. 14, 2001, entitled Electronic legal research ordering and pricing system and method of defining electronic legal research instructions and values and calculating pricing of electronic legal research orders.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

STATEMENT REGARDING FEDERALLY SPONSORED RESEARCH

This invention was not made by an agency of the United States Government or under contract with an agency of the United States Government.

BACKGROUND OF THE INVENTION

1. Field of the Invention

The invention relates generally to an electronic system and method for accessing and providing standardized legal research services, and more particularly to an electronic system and method for virtual standardization and ordering of legal research projects on a network using standardized legal research instructions and complexity value/price calculations defined by the method.

2. Description of the Related Art

Most lawyers must obtain legal research during the representation of their clients, often under very tight deadlines. Traditionally, legal research has been performed by junior lawyers, law clerks and paraprofessionals employed within a law firm or similar organization. Legal research assignments are usually given in time-consuming, face-to-face meetings or in memoranda where the legal issue to be researched and non-specific legal research instructions are discussed. This traditional way of obtaining legal research is often inefficient in that (a) confusion and misunderstandings result because the legal researcher is not given standardized legal research instructions and specifications, and (b) the legal research must be performed internally, at the expense of other important activities of a law practice and at the cost of recruiting, employing and supervising researchers (attorneys or paraprofessionals) even though legal research needs vary over time.

Recently, independent legal research providers external to law firms and similar organizations have begun to offer legal research services on an outsourcing basis. Although these providers may often be contact through Internet web sites, lawyers and others desiring to purchase legal research from them cannot do so in a standardized, automated fashion utilizing the Internet or any other automated system. Lawyers and other purchasers must still hold time-consuming meetings and/or telephone conversations with these providers to discuss the legal issue to be researched and the research parameters, again creating confusion and misunderstandings because standardized and specific legal research instructions and specifications are not given. This is particularly problematic given the advent of offshore outsourcing of legal research to other countries, such as India, where legal language and customs vary and communications are difficult. Additionally, lawyers and other purchasers must engage in time-consuming negotiations with these providers over the terms of the engagement and develop and execute purchase or service agreements. Because each legal research project is sui generis, and the amount of time to complete a legal research project is difficult to predict, most independent legal research providers insist on being paid on an open-ended hourly basis, creating a risk of cost overruns for purchasers and making the service less attractive.

What is desired, therefore, is an apparatus, system and method for automating the ordering, valuation, pricing and provision of legal research that systematizes and standardizes complex legal research instructions and specifications and calculates values and prices for each customized legal research project, allowing lawyers and other acquirers/purchasers of legal research to obtain legal research quickly and efficiently at fixed prices quoted in advance. Also desired is an automated system that allows legal research providers to standardize legal research instructions and specifications and that allows for the automated settlement of transactions, for example by credit card.

BRIEF SUMMARY OF THE INVENTION

Therefore, an object of the invention is to provide an electronic system, apparatus, device and method for standardizing and automating the assignment, valuation, pricing and purchasing of legal research projects.

Another object of the invention is to provide a device and method for defining, systematizing and standardizing legal research instructions and specifications.

Another object of the invention is to provide a device and method for defining, systematizing, standardizing and calculating complexity valuations and fixed prices for customized legal research projects.

These and other objects of the invention are achieved by creation of an electronic legal research ordering and pricing device and system, and a method of defining electronic legal research instructions and values and ordering and calculating prices of electronic legal research orders. The device and system include a network composed of a legal research purchaser's computer, a legal research provider's computer, a settlement organization's computer, an electronic legal research ordering and pricing server, and connections between these elements (e.g., the Internet).

The electronic legal research ordering and pricing server component of the invention includes the following elements: a legal research instruction and specification options database, a legal research instruction and specification values database, a legal research pricing database, a legal research delivery options and pricing database, a display information section, an order reception and price calculation section, a basket database, a settlement processing section, a final order processing section, an orders database, a parameter definition section, and a file search section.

The invention also comprises a method of defining electronic legal research instruction and specification options and pricing values. In one mode, this is accomplished first by establishing and storing in a database standardized primary and secondary legal research instructions and specifications that organize and manage specific legal research instructions and specifications and pricing values. Second, standardized legal research instructions and specifications are established and stored. Third, complexity values for each standardized legal research instruction and specification are assigned and stored in a legal research instruction and specification values database.

The invention also comprises a method of calculating customized legal research prices based upon the legal research instructions and specifications selected by a purchaser. In one mode, this is accomplished by first establishing and storing price ranges that correspond to the pricing values assigned and stored in the legal research instruction and specification values database. Second, the complexity values of the specific legal research instructions and specifications selected by a purchaser for a particular order are compared with the price ranges corresponding to said values, and an interim price is generated. Third, this interim price is adjusted by the price of delivery options and means defined by the legal research provider and selected by the purchaser to arrive at a final price.

DETAILED DESCRIPTION OF THE PREFERRED EMBODIMENTS

Figure 1:
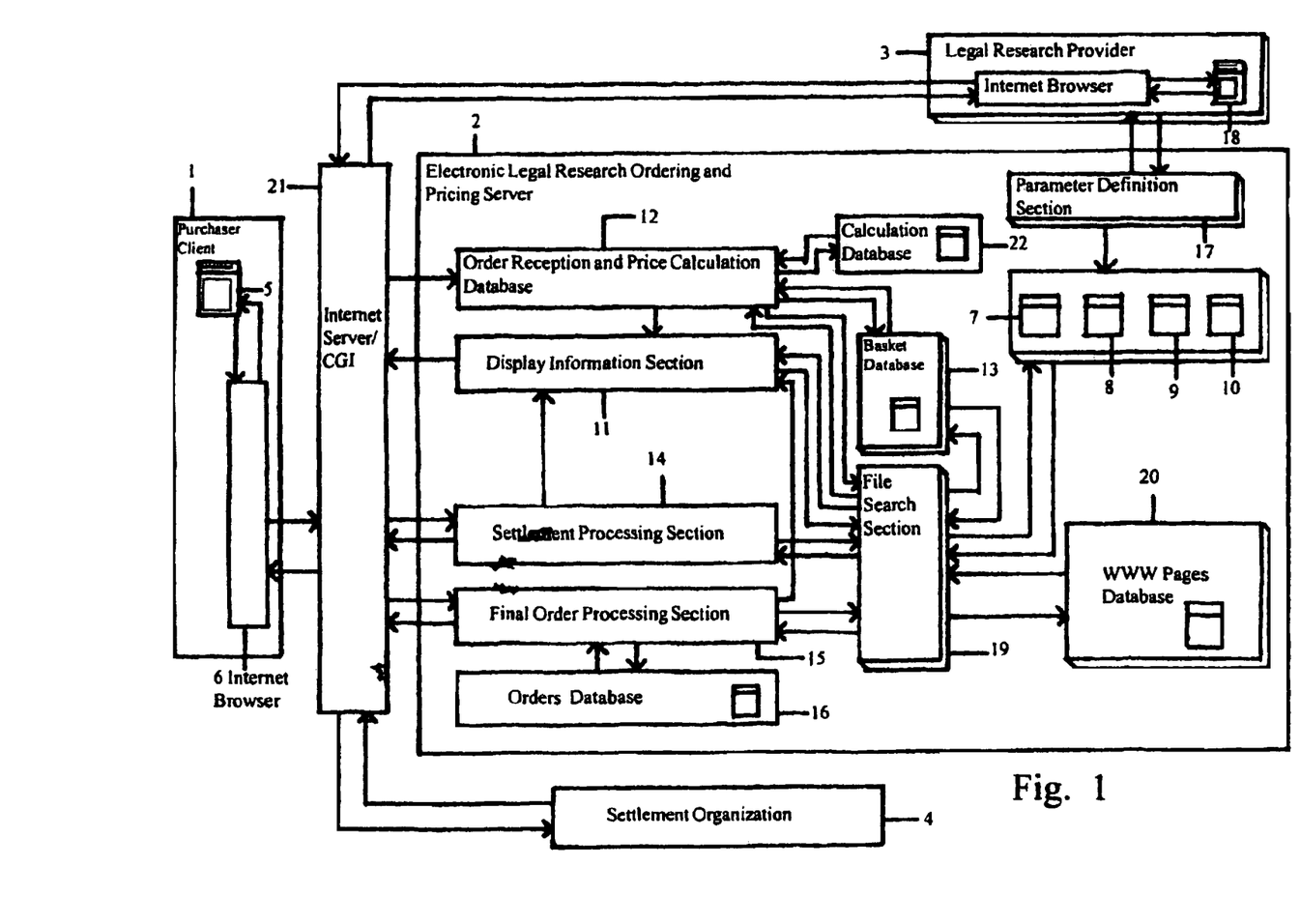
FIG. 1 shows one specific embodiment of an electronic legal research ordering and pricing system in accordance with the invention.

FIG. 1 is a drawing showing the configuration of an electronic legal research ordering and pricing system according to an embodiment of the present invention.

As shown in FIG. 1, the electronic legal research ordering and pricing system comprises a purchaser client 1, an electronic legal research ordering and pricing server 2, a legal research provider 3, and a settlement organization 4 (e.g. a credit card provider or bank), which are interconnected with each other through a network. The present embodiment will be described on the assumption that the network connecting a purchaser client 1, an electronic legal research ordering and pricing server 2, a legal research provider 3, and a settlement organization 4, is the Internet, although any suitable interface including voice telephone communication and the postal service is contemplated within the scope of the invention.

According to the present embodiment, a purchaser client 1 is a terminal (e.g., a personal computer or other Internet access device) used by a purchaser to order and purchase legal research. A purchaser client 1 has an input/output device such as a keyboard or a mouse and an output device such as a CRT screen 5. A purchaser client 1 may have an Internet browser 6 serving as the interface with an electronic legal research ordering and pricing server 2, although any suitable interface is contemplated within the scope of the invention. An electronic legal research ordering and pricing server 2, receives, stores, processes and displays legal research ordering, pricing and processing information, and includes a legal research instruction and specification options database 7, a legal research instruction and specification values database 8, a legal research pricing database 9, a legal research delivery options and pricing database 10, a display information section 11, an order reception and price calculation section 12, a basket database 13, a settlement processing section 14, a final order processing section 15, an orders database 16, a parameter definition section 17, and a file search section 19.

A legal research provider 3, defines essential legal research instruction and specification options that can be followed by the legal research provider and selected by a purchaser client 1, by using a parameter definition section 17, through an input/output device 18, such as a computer. This data can include the type of legal research to be performed (e.g., case law, statutory, regulatory research), specification of the law controlling the legal issue under consideration (e.g., federal or state constitutions, statutes, regulations or common law), the forum in which the case is being heard (e.g., federal or state courts, agencies or other tribunals), the sources of law to be researched (e.g., federal or state constitutions, statues, regulations, common law, judicial rules, law reviews and treatises), the subject matter of the issue to be researched (e.g., procedural questions or areas of substantive law such as civil rights, criminal, contracts and torts), the type of research (online or law library), and whether the research is related to prior or contemporaneous legal research orders. Data defined here are transferred to the legal research ordering and pricing server 2, and stored in a legal research instructions and specifications database 7.

For each legal research instruction and specification option included in the legal research instructions and specifications database 7, a legal research provider 3, assigns a value by using a parameter definition section 17, through an input/output device 18, such as a computer. In this embodiment, the pricing values assigned by a legal research provider 3, are numerals related to and based upon the complexity of and time needed to perform each legal research instruction and specification, although other means of designating and determining the value of legal research instructions and specifications (e.g., equations and/or algorithms) are contemplated within the scope of the invention. Data defined here are transferred to the legal research ordering and pricing server 2, and stored in a legal research instruction and specification values database 8.

Using a parameter definition section 17 through an input/output device 18, such as a computer, a legal research provider 3, defines the price ranges for legal research it will provide in relation to the total value score for any legal research project ordered, which is the summation of all values assigned by the legal research provider 3, to the specific legal research instruction and specification options selected by a purchaser client 1. Data defined here are transferred to the legal research ordering and pricing server 2, and stored in a legal research pricing database 9.

A legal research provider 3, defines the delivery time and means options that can be met by the legal research provider and selected by a purchaser client 1, by using a parameter definition section 17, through an input/output device 18, such as a computer. For each delivery time and means option defined by the legal research provider 3, the legal research provider 3, assigns a price adjustment for legal research to be delivered within the specified time and by the specified means. Data defined here are transferred to the legal research ordering and pricing server 2, and stored in a legal research delivery options and pricing database 10.

A display information section 11, serves as a World Wide Web (WWW) page generator, producing for a purchaser client 1, display information including legal research instruction and specification options, delivery time and means options, pages where the legal issue to be researched and facts related to the issue can be stated, order and price summary information with options to modify or delete orders, customer information (e.g., name and address), terms and conditions information, settlement information and final order confirmation and processing information. The display information section 11, obtains the information for display by means of a file search section 19, which searches through the databases in the electronic legal research ordering and pricing server for the appropriate information to construct WWW pages and/or pre-designed WWW pages stored in a WWW pages database 20.

One or more Internet servers/CGIs (Common Gateway Interfaces) 21, serve as an interface between a purchaser client 1 and an electronic legal research ordering and pricing server 2. The Internet servers/CGIs receive display/request/input information from a purchaser client 1, which they transfer to an electronic legal research ordering and pricing server 2. The Internet servers/CGIs also receive display/request/output data from an electronic legal research ordering and pricing server 2, which they transfer to a purchaser client 1.

An order reception and price calculation section 12, receives from a purchaser client 1 (via, e.g., an Internet server/CGI) and stores in a basket database 13, for each legal research project ordered, all selected legal research instruction and specification options, all selected delivery time and means options, the legal issue to be researched, facts related to the issue (optional), and customer information (e.g., name and address).

For each legal research project ordered, the order reception and price calculation section 12, utilizing the file search section 19, searches through the legal research instruction and specification value database 8, for the value assigned by a legal research provider 3, to each legal research instruction and specification option selected by a purchaser client 1. The order reception and price calculation section 12, calculates the total value for the legal research project and stores it in a calculation database 22.

For each legal research project ordered, the order reception and price calculation section 12, utilizing the file search section 19, next searches through the legal research pricing database 9, for the price range assigned by a legal research provider 3, to the total value calculated for the legal research project. This becomes the interim price for each legal research project ordered by the purchaser client 1, and is stored in the calculation database 22.

For each legal research project ordered, the order reception and price calculation section 12, utilizing the file search section 19, next searches the legal research delivery options and pricing database 10, for the price adjustment assigned by a legal research provider 3, to each legal research delivery means and specification option selected by a purchaser client 1. The order reception and price calculation section 11, determines the final price for each legal research project ordered by a purchaser client 1, by adjusting the interim price stored in the calculation database 22, to reflect all delivery means and specification option price adjustments. The final price for each legal research project ordered by the purchaser client 1, is stored in the basket database 13, along with the other information received by the purchaser client 1, for each legal research project ordered.

A display information section 11, displays to the purchaser client 1, a summary of each legal research project ordered, its final price, and a total final price for all legal research projects ordered (if more than one). This displayed information can include a summary of all selected legal research instruction and specification options, a summary of all selected delivery time and means options, and the legal issue to be researched and facts (optional) related to the issue. The display information section 11, obtains this information from the basket database 13, through the file search section 19.

A settlement processing section 14, receives from the file search section 19, the total final price for all legal research projects ordered, and receives from the purchaser client 1, information necessary to provide payment for the legal research projects ordered (e.g., account information). Based upon this information, the settlement processing section 14, requests a settlement organization 4 (or a legal research provider 3, in cases of accounts maintained by a legal research provider 3), to authorize execution of a settlement. An Internet Server/CGI 21, may serve as the interface between the settlement organization 14 (and/or legal research provider 3), and the electronic legal research ordering and pricing server 2. When the settlement processing section 14, receives authorization of the ability to complete the settlement from the settlement organization 4, and/or legal research provider 3, it transfers this information to a display information section 11, which displays it to a purchaser client 1. A final order processing section 15, receives from a purchaser client 1, confirmation of submission of the order. Upon receipt of this information, the final order processing section 15, submits the order to the settlement organization 4, for final settlement, and receives final settlement notification. The final order processing section 15, also obtains from the file search section 19, all information related to the order, including a summary of all selected legal research instruction and specification options, a summary of all selected delivery time and means options, the legal issue to be researched and facts (optional) related to the issue, the final price for each legal research project ordered, and the total final price for all legal research projects ordered. The final order processing section 15, stores all order data and settlement data in an orders database 16, and notifies the legal research provider 3 that an order has been received and/or transfers this information directly to the legal research provider 3, through the Internet Server/CGI for further handling.

The electronic legal research ordering and pricing server 2, can be comprised of an information processing apparatus such as a personal computer or computer server. All of the above-described databases may be stored in a storage device such as a magnetic disk or optical disk included within or available to this information processing apparatus. All of the above-described processing sections are preferably executed by a software program stored in or available to this information processing apparatus.

Figure 2:
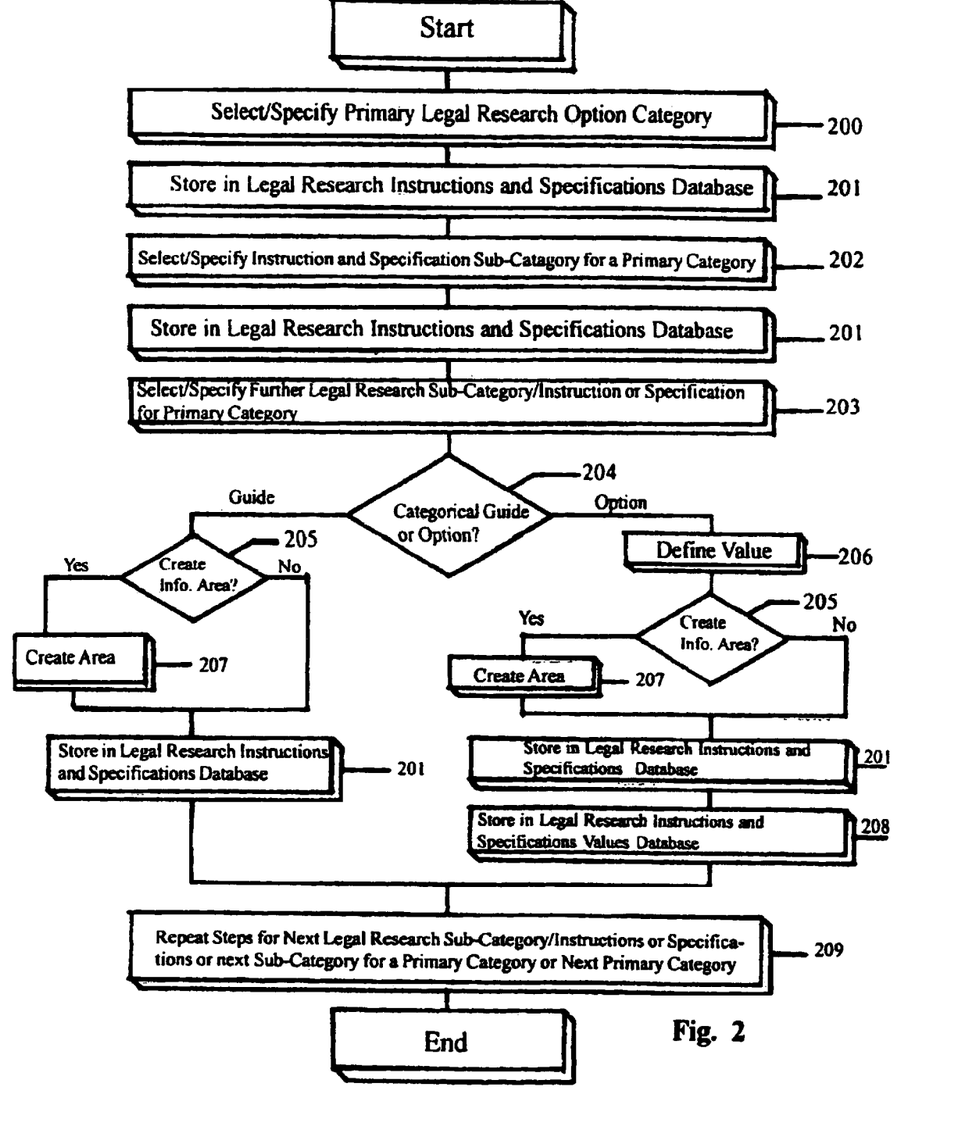
FIG. 2 is a flowchart describing a method of defining electronic legal research instruction and specification options and assigning pricing values, according to one specific embodiment of the present invention.

FIG. 2 outlines a method of defining electronic legal research instruction and specification options and assigning pricing values, according to an embodiment of the present invention. First, the essential primary standardized legal research instruction and specifications must be defined by the legal research provider 3 (Step 200). In this step, the parameter definition section 17, displays information through an input/output device 18, on existing primary standardized instructions and specifications maintained in the legal research instructions and specifications options database 7. The legal research provider 3, selects a desired primary instruction if it exists among the instructions. If a desired primary instruction does not exist, a new primary instruction can be created by the legal research provider 3, by using the input/output device 18. Alternatively, existing primary instructions may be deleted in the same way. Standardized primary legal research instructions and specifications are used by the legal research provider 3, to organize and manage specific legal research instructions and specifications and pricing values. For example, the following standardized primary instructions and specifications would be defined under an embodiment of the invention:

A. Type of Analysis (e.g., case law, statutory, regulatory, judicial rules)

B. Controlling Law (the law(s) that control the issue to be researched

C. Forum (the tribunal hearing the case related to the issue to be researched)

D. Sources of Law (the specific sources of law to be researched)

E. Subject Matter (the subject of the legal issue to be researched, e.g., substantive/procedural)

F. Type of Research (e.g., on line or law library)

When a primary legal research instructions and specifications are defined, they are stored by parameter definition section 17, in the legal research instructions and specifications options database 7 (Step 201).

The definition of standardized primary legal research instruction and specification categories is followed by the definition of essential standardized legal research sub-instructions and sub-specifications within each primary instruction and specification (Step 202). In this step, the parameter definition section 17, displays information through an input/output device 18, on any existing standardized sub-instructions and sub-specifications maintained in the instructions and specifications database 7. The legal research provider 3, selects a desired sub-instruction if it exists among the displayed instructions. If a desired sub-instruction does not exist, a new sub-instruction can be created using the input/output device 18. Alternatively, existing sub-instruction may also be deleted in the same way. Standardized legal research sub-instructions and specifications are used by the legal research provider 3 and the purchaser client 1, to further organize and manage the specific legal research instructions and specifications and pricing values.

When a standardized legal research instruction and specification sub-category is defined, it is stored by the parameter definition section 17, in the legal research instructions and specifications options database 7 (Step 201).

The definition of standardized legal research sub-instructions and sub-specifications is followed by the definition of further sub-instructions/specific legal research instructions and specifications (Step 203). In this step, the parameter definition section 17, displays information through an input/output device 18, on any existing additional standardized instructions and specifications maintained in the standardized instructions and specifications database 7. The legal research provider 3, selects desired standardized instructions and specifications if they exist. If a desired instruction or specification does not exist, a new standardized instruction or specification can be created using the input/output device 18. Alternatively, such instructions and specifications may be deleted in the same way.

FIG. 6 shows standardized primary legal research instructions and specifications, sub-instructions and specifications and specific instructions and specifications, including numerical complexity values under the preferred embodiment of the invention. These instructions and specifications are defined by the legal research provider through the parameter definition section 17, and, when the system is operational as described below, displayed to a purchaser client 1, as options for selection during the ordering and purchasing process by means "click box" and "submit button" functions, allowing selections to be made, erased and transmitted by the purchaser client 1, back to the electronic legal research ordering and pricing server 2.

For each standardized legal research sub-instruction and sub-specification defined by the legal research provider 3, according to the above-described process, the parameter definition section 17, requests that the legal research provider 3, through the input/output device 18, specify whether the defined sub-instruction and sub-specification is either (a) a categorical guide only, to be displayed to a purchaser client 1, for which a pricing value will not be defined, or (b) an option that can be selected by a purchaser client 1 while ordering legal research, for which a pricing value is to be defined (Step 204). The parameter definition section 17, also provides the legal research provider 3, with the ability to create for each defined legal research instruction and specification an additional information area or "box" within which a purchaser client 1, can provide additional information about a selected legal research instruction or specification, such as the specific name of an administrative agency or source of law to be researched (Step 205).

If the legal research provider 3, specifies that a defined sub-instruction or sub-specification is a categorical guide only, the parameter definition section 17, asks whether an additional information area is needed (Step 205), creates this area if requested (Step 207), stores the information in the legal research instructions and specifications options database 7 (Step 201) and moves on to ask for the next sub-category or legal research instruction and specification (Step 209).

If the legal research provider 3, specifies that a defined standardized legal research sub-instruction or sub-specification is an option that can be selected by a purchaser client 1, while ordering legal research, the parameter definition section 17, requests that the legal research provider 3, define the pricing value for the sub-instruction or sub-specification (Step 206). According to the present embodiment of the invention, the legal research provider 3, using an input/output device 18, inputs a positive or negative number representing the value of the sub-instruction or sub-specification, based upon an assessment by the legal research provider 3, of the complexity of and time needed to perform each legal research instruction and specification. For example, a legal research provider 3, may assign one legal research instruction or specification with a value of +10 (meaning high complexity and time to complete), another legal research instruction or specification a value of 0 (meaning average complexity and time to complete) and another legal research instruction or specification with a value of −10 (meaning low complexity and time to complete). The parameter definition section 17, then asks whether an additional information area is needed (Step 205) and creates this area if requested (Step 206). The parameter definition section 17, then stores the sub-category/legal research instruction or specification in the legal research instructions and specifications options database 7 (Step 201), and stores the defined value in the legal research instruction and specification values database 8 (Step 208), and moves on to ask for the next sub-instruction and sub-specification (Step 209).

Figure 3:
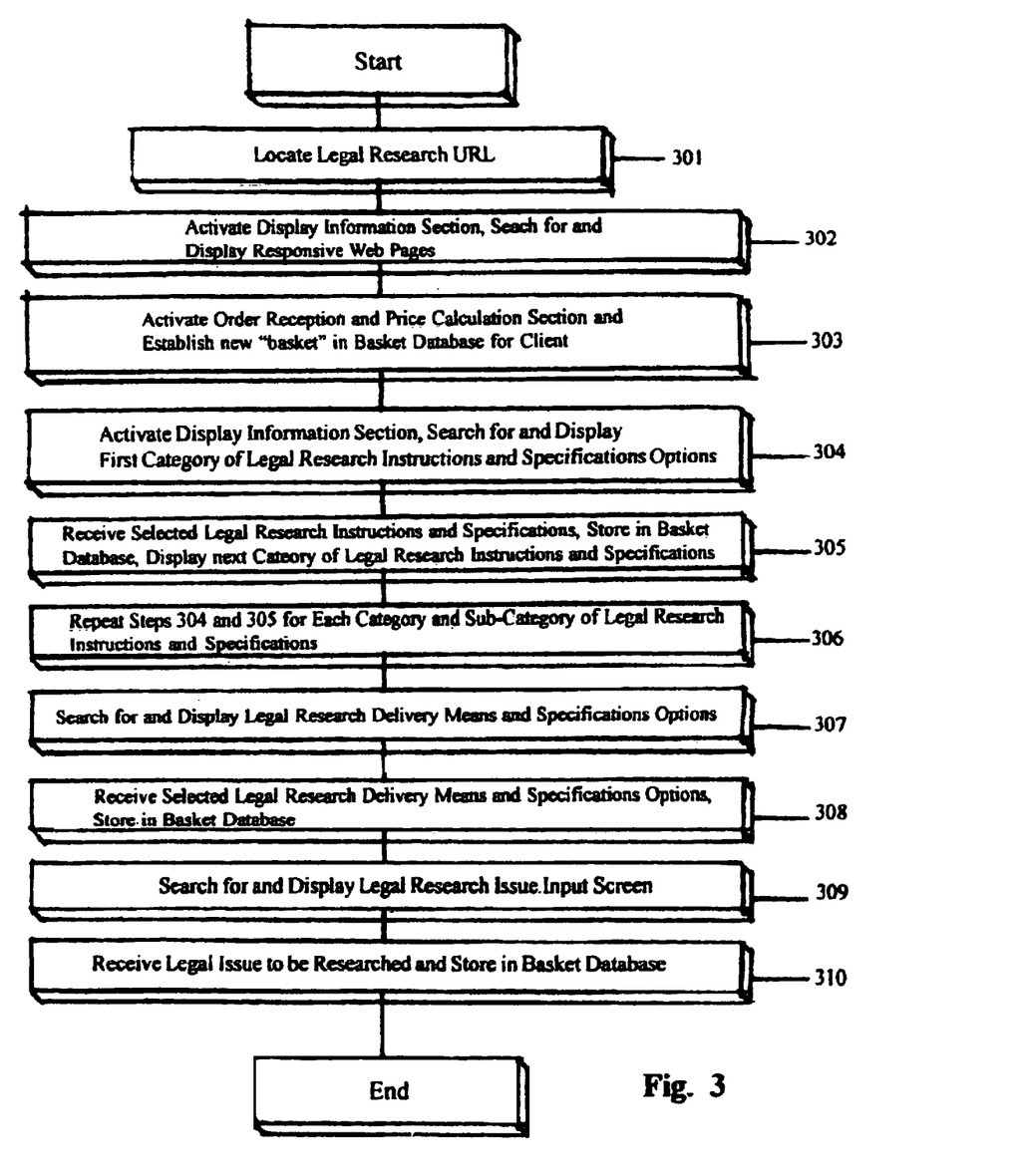
FIG. 3 is a flowchart of processing steps executed when legal research orders are placed electronically and prices are calculated electronically.

FIG. 3 outlines a flow of processing steps when legal research orders are placed electronically and prices are calculated electronically.

A user or purchaser desiring to order legal research inputs a URL address (uniform resource locator) through the purchaser client 1, as a request screen page, for the location on the WWW at which the electronic legal research ordering and pricing server 2, can be accessed (e.g., the web site of a legal research provider 3, or a web site that provides legal research order reception and processing to multiple legal research providers). An Internet server/CGI 21, to which the purchaser client 1 has a connection, locates the URL, itself an Internet server/CGI 21, with which the electronic legal research ordering and pricing server 2, has a connection. This process is similar to electronic commerce systems generally, and a detailed description is not provided (Step 301).

The URL/Internet server/CGI 21, receives the display request page information and activates the display information section 11, of the electronic legal research ordering and pricing server 2, which analyzes the request and utilizes the file search section 19, to locate and display responsive web page information from the WWW pages database 20, such as the home page for the web site (Step 302). Additional information may be requested by the user or purchaser and displayed in the same manner.

When the user or purchaser decides to purchase legal research, information including purchaser client identification (client ID) and a request to place an order is transferred from the client purchaser 1, as display request page information, and the URL/Internet server/CGI 21, activates the order reception and price calculation section 12, which establishes a new "basket" or file in the basket database 13, for the user or purchaser (Step 302). The order reception and price calculation section 12, then activates the display information section 11, which, utilizing the file search section 19, searches the legal research instructions and specifications options database 7, and the WWW pages database 20, to create and display the first standardized primary legal research instructions and specifications and appropriate sub-instructions and sub-specifications (Step 304). FIG. 6 shows a screen layout of this display (omitting the "selection", "clear form" and "submit" buttons as described above) under the preferred embodiment of the invention.

Utilizing the purchaser client 1, the user or purchaser selects and inputs the legal research instruction and specification options desired from the displayed standardized instructions and specifications and submits these as request screen information. The order reception and price calculation section 12, receives the selected legal research instructions and specifications and stores them in the basket database 13, then activates the display information section 11, to display the next standardized legal research instructions and specifications (Step 305). Step 304 and Step 305 are repeated for each standardized primary instruction and specification and all sub-instruction and sub-specification (Step 306). FIG. 6 shows these standardized primary instructions and specifications, and all sub-instructions and sub-specifications, under the preferred embodiment of the invention.

When all standardized legal research instruction and specification options have been selected, input and stored in the basket database 13, the display information section 11, utilizing the file search section 19, searches the legal research delivery options and pricing database 10, and the WWW pages database 20, and creates and displays a screen with the legal research delivery means and specification options (Step 307). Utilizing the purchaser client 1, the user or purchaser selects and input the delivery options desired as request screen information. The order reception and price calculation section 12, receives the selected delivery options and stores them in the basket database 13, then activates the display information section 11, to display the legal issue input screen (Step 308).

Utilizing the file search section 19, the display information section 11, searches the WWW pages database 20, and creates and displays a legal research issue input screen, which provides space for the user or purchaser to input the legal issue to be researched pursuant to the instructions and specifications previously given (Step 309). Utilizing the purchaser client 1, the user or purchaser selects and inputs the delivery options desired as request screen information. The order reception and price calculation section 12, receives the legal issue input and stores it in the basket database 13, then calculates the price for the legal research order (Step 310).

Figure 4:
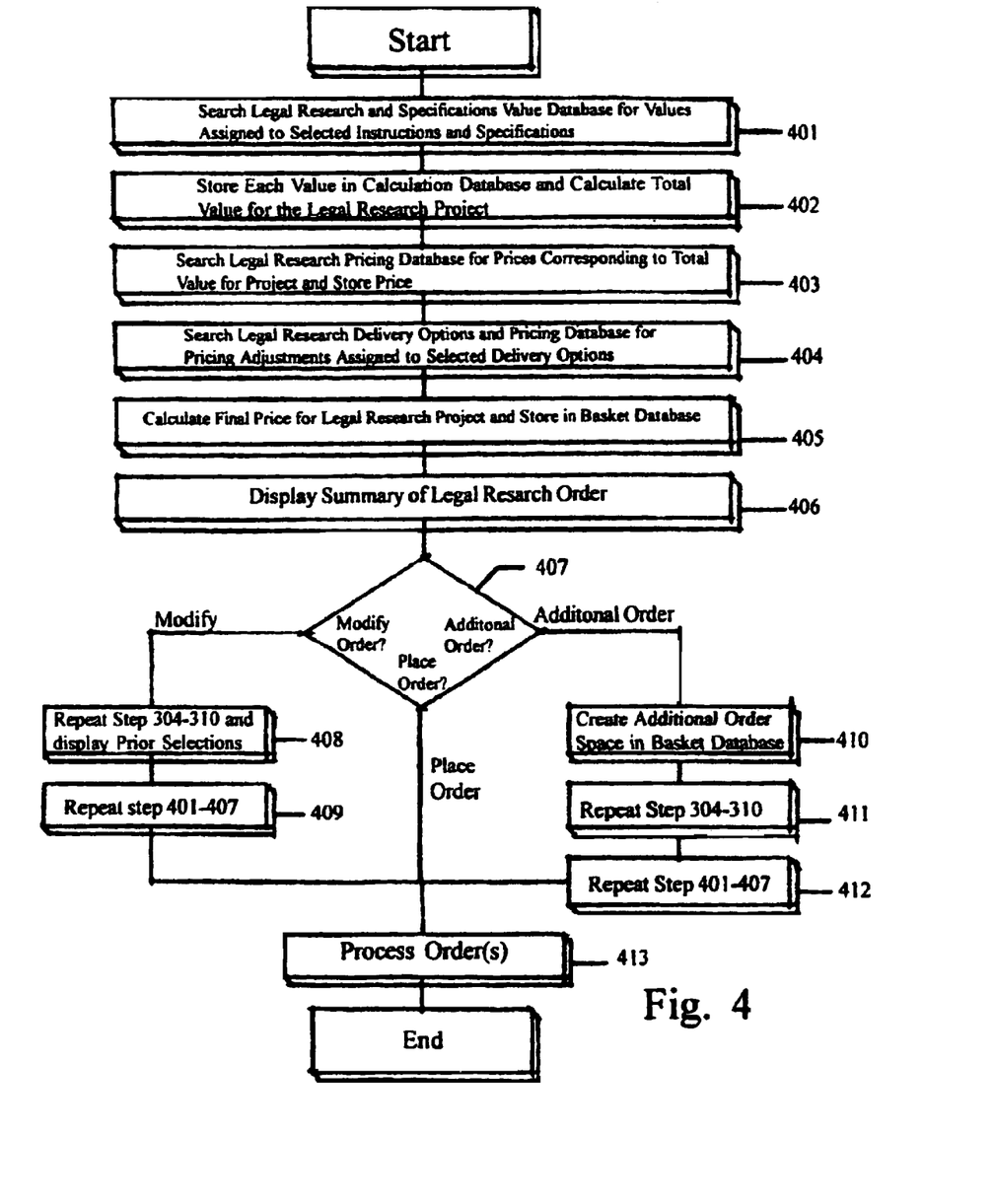
FIG. 4 is a flowchart of processing steps executed to calculate the price of a legal research order.

The flow of processing steps executed to calculate the price of a legal research order is shown as FIG. 4. First, the order reception and price calculation section 12, utilizing the file search section 19, searches through the legal research instruction and specification value database 8, for the value assigned by a legal research provider 3, to each legal research instruction and specification option selected by the purchaser client 1 that is stored in the basket database 13 (Step 401). The order reception and price calculation section 12, stores each value in the calculation database 22, and then calculates the total value for the legal research project and stores it in the calculate database 22 (Step 402).

Next, the order reception and price calculation section 12, utilizing the file search section 19, searches through the legal research pricing database 9, for the price range assigned by a legal research provider 3, to the total value calculated for the legal research project (Step 403). For example, the price for legal research projects having a value range between 30 and 35 might be $600, but only $300 for legal research projects having a value range between 15 and 20. This price becomes the interim price for each legal research project ordered by the purchaser client 1, and is stored in the calculation database 22.

Next, the order reception and price calculation section 12, utilizing the file search section 19, searches the legal research delivery options and pricing database 10, for the price adjustments assigned by a legal research provider 3, to each legal research delivery means and specification option selected by a purchaser client 1 (Step 404). The order reception and price calculation section 11, calculates the final price for each legal research project ordered by a purchaser client 1, by adjusting the interim price stored in the calculation database 22, to reflect all delivery means and specification option price adjustments (Step 405). For example, for delivery within 24 hours, the interim price might be multiplied by 2.0, whereas for delivery within 7 days the interim price might be multiplied by 1.2. The final price for each legal research project ordered by the purchaser client 1, is stored in the basket database 13, along with the other information received by the purchaser client 1, for each legal research project ordered (Step 405). Other price adjustments may be made by utilizing the same process (e.g., reducing the price of follow-up research related to a prior legal research order).

When the final price is calculated, the order reception and price calculation section 12, activates the display information section 11, which, utilizing the file search section 19, searches the basket database 13 and the WWW pages database 20, to create and display to the purchaser client 1, a summary of the legal research ordered, including the legal research instructions and specifications selected, the legal research issue stated, the delivery options and means specified and the price (Step 406). The user or purchaser is prompted on this summary screen to indicate whether (a) modifications to the order are desired; (b) additional legal research orders are desired; or (c) the user or purchaser wishes to proceed to place the order (Step 407).

If the user or purchaser inputs, through the purchaser client 1, that modifications are desired, Step 304 through Step 310 are repeated, with the exception that the display information section 11, also searches the basket database 13, and displays the legal research instructions and specifications and delivery means and specifications previously selected (Step 408). The user or purchaser, utilizing the purchaser client 1, is given the option at each step to change previously selected options or to leave them the same. When all options have been selected and stored in the basket database 13 (replacing prior options as indicated), the order reception and price calculation section 12, re-calculates the price and activates the display information section 11, to display a summary and give the user or purchaser the option of making additional modifications, ordering additional research or proceeding to place the order(s)(Step 413)—repeating Step 401 through Step 407 (Step 409).

If the user or purchaser inputs, through the purchaser client 1, that additional legal research orders are desired, the order reception and price calculation section 12, creates additional order space for the user or purchaser in the basket database 13 (Step 410). Step 304 through Step 310 are repeated (Step 411), and Step 401 through Step 407 are repeated (Step 412), with the user or purchaser again being given the option to make modifications, order additional research or proceeding to place the order(s) (Step 413).

Figure 5:
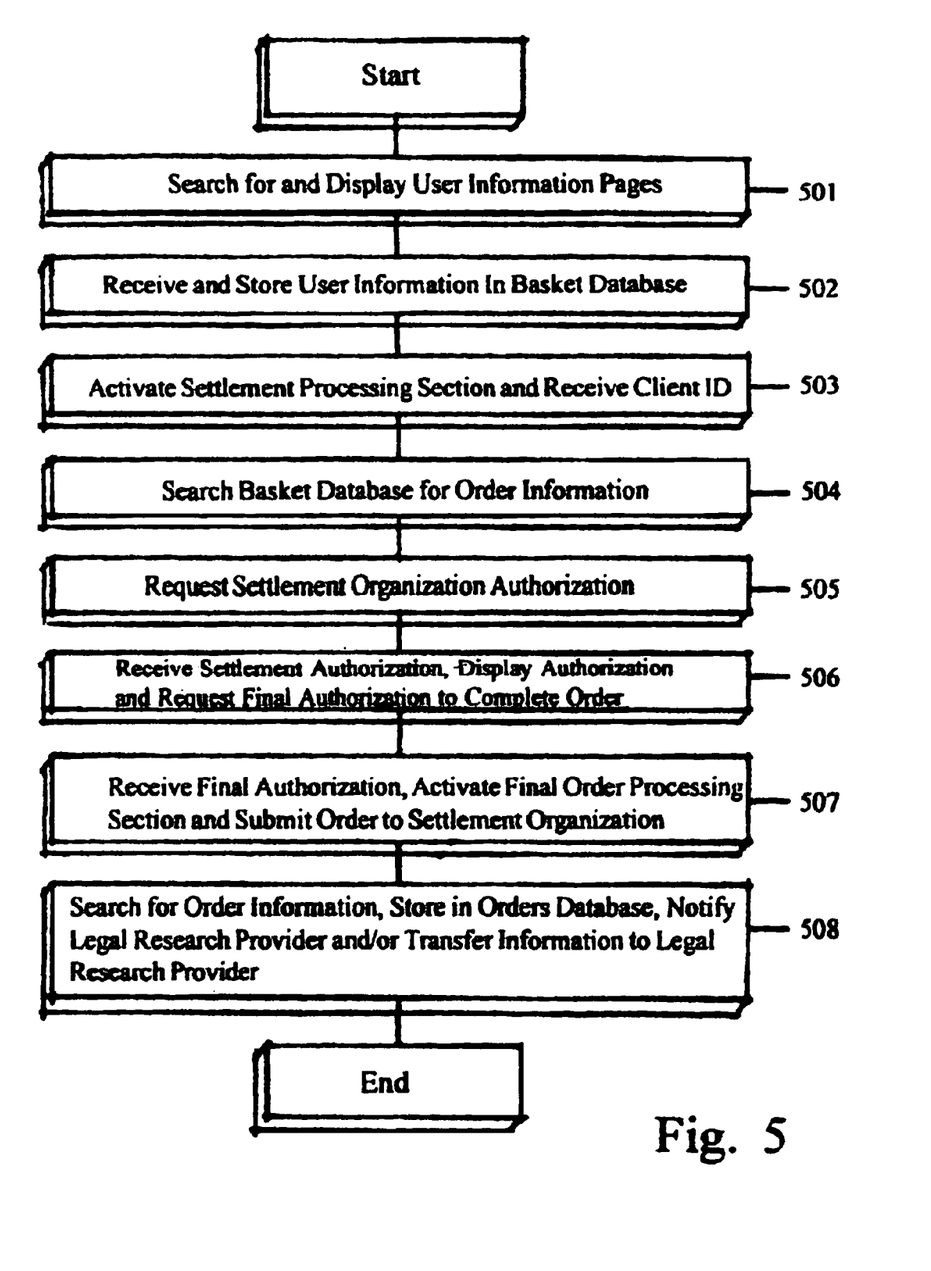
FIG. 5 is a flowchart of processing steps when a user or purchaser proceeds to place a legal research order.
Figure 6A:
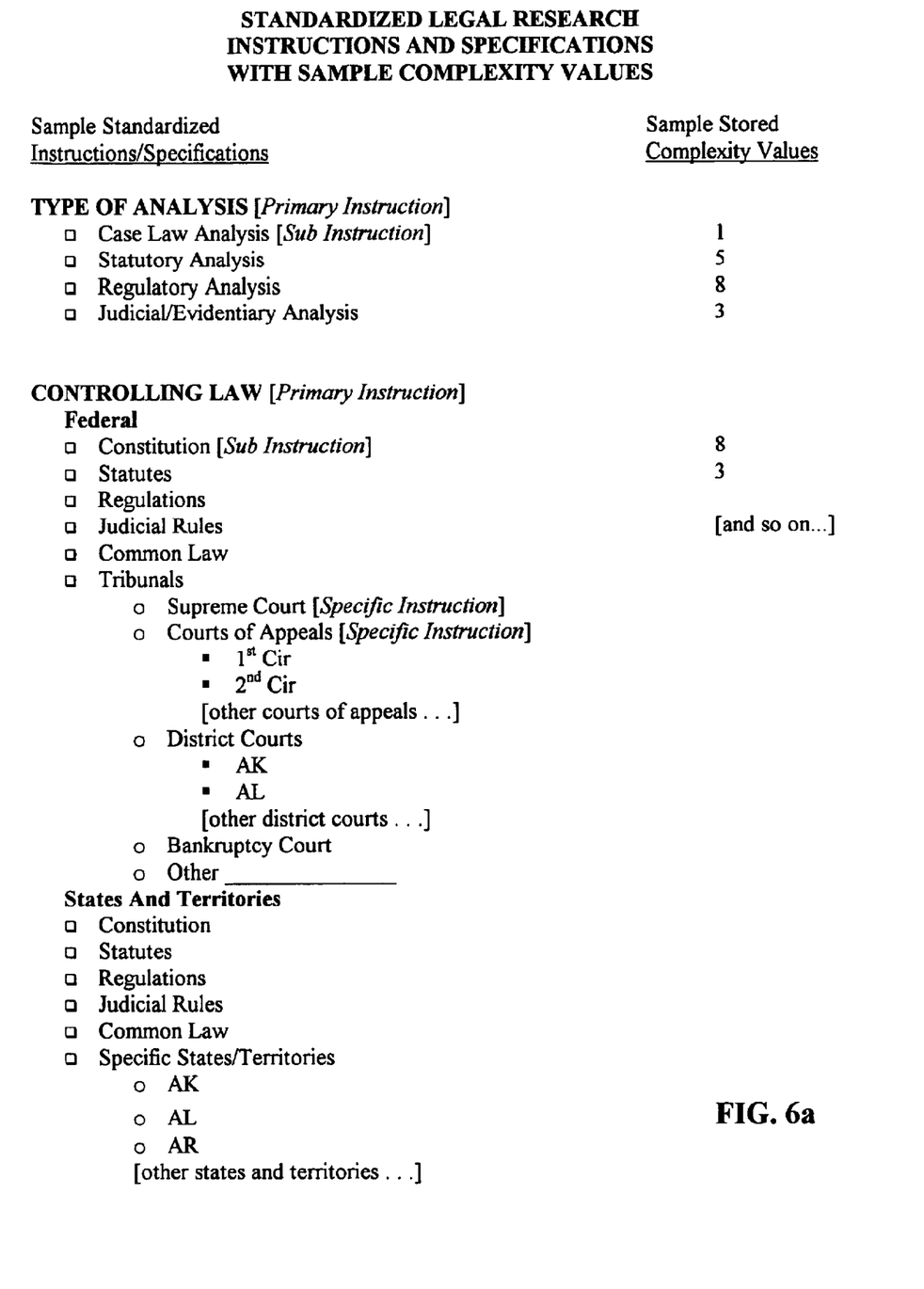
FIG. 6a, FIG. 6b, FIG. 6c, and FIG. 6d shows standardized primary legal research instructions and specifications, sub=instructions and specifications and specific instructions and specifications, including numerical complexity values under the preferred embodiment of the invention.
Figure 6B:
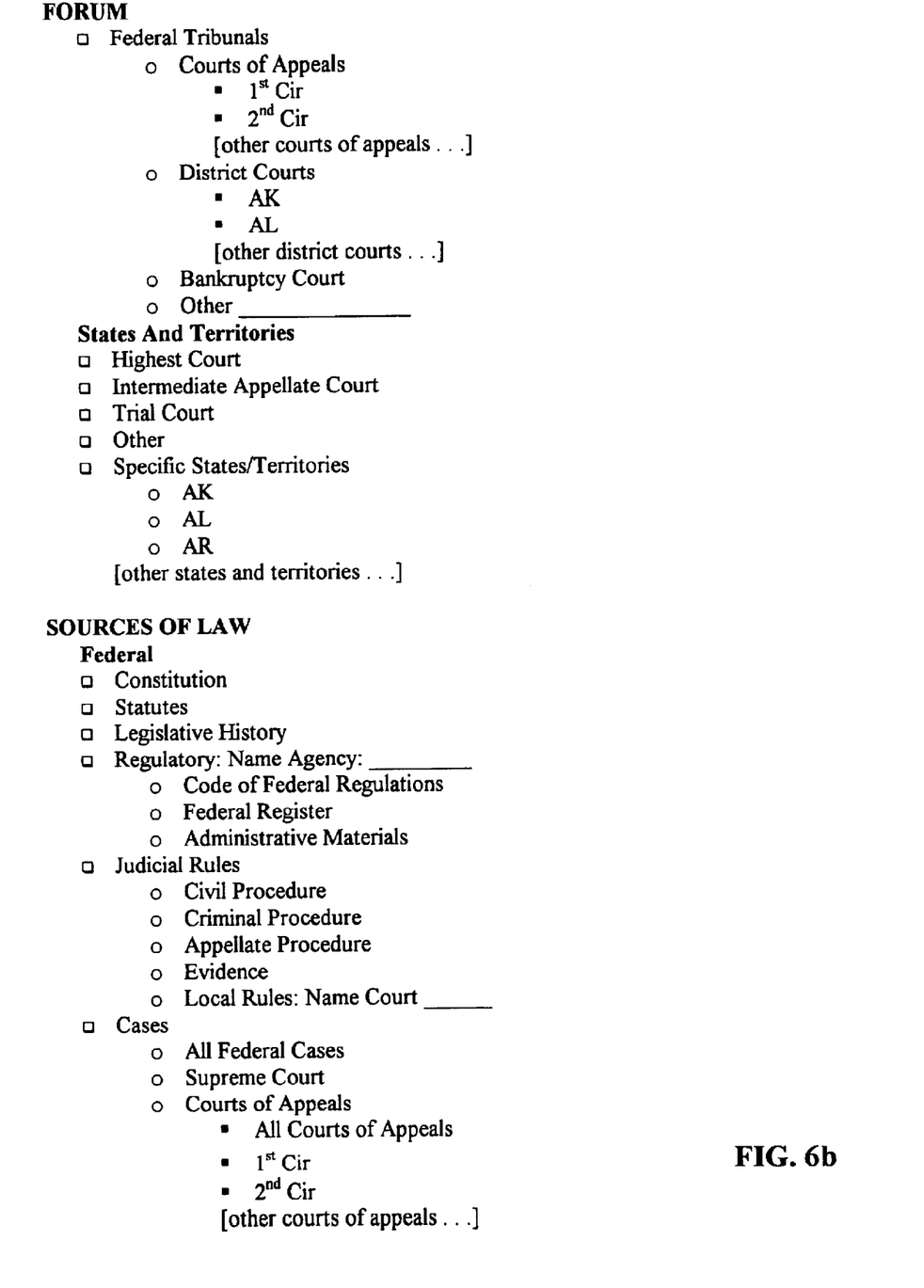
Figure 6C:
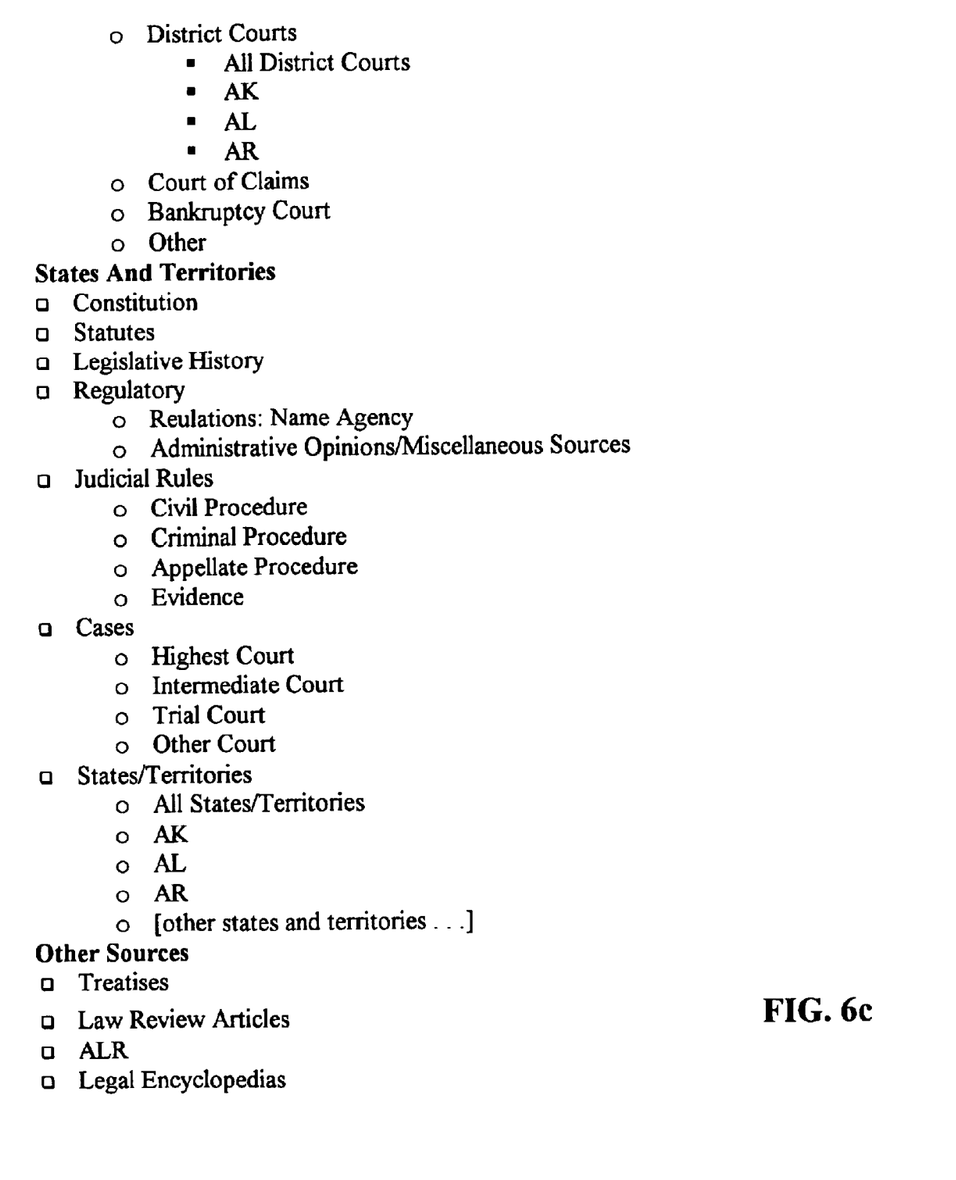
Figure 6D:
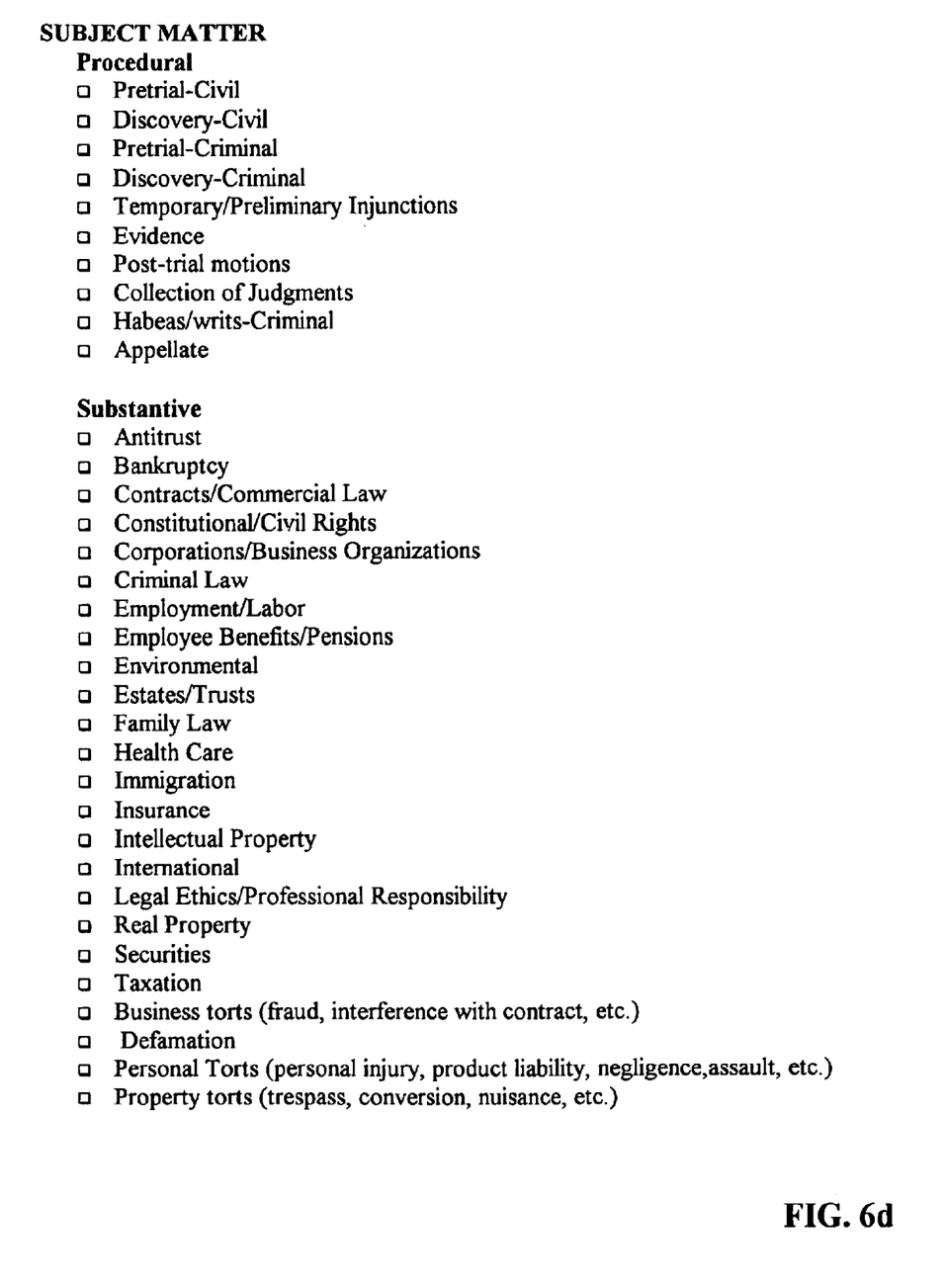

FIG. 5 illustrates the flow of processing steps when a user or purchaser indicates a desire to proceed to place/process the order(s). First, the display information section 11, utilizing the file search section 19, searches the WWW pages database 20 and creates and displays screen pages asking the user or purchase to provide full name, address, telephone number, email address and credit card or account payment information (Step 501). Utilizing the purchaser client 1, the user or purchaser inputs the requested data, which is stored by the display information section 11, in the basket database (Step 502). Next, the display information section 11, activates the settlement processing section 14, which receives the client ID from the display information section (Step 503). Using the received client ID, the settlement processing section 14, utilizing the file search section 19, searches the basket database for order information stored for the user or purchaser (Step 504). Based upon this information, the settlement processing 14, utilizing an Internet server/CGI 21, requests the settlement organization 4 (or a legal research provider 3, in cases of accounts maintained by a legal research provider), to authorize a settlement (Step 505). As this is not different from the typical electronic commerce settlement authorization, a detailed description is not provided.

When the settlement processing section 14, receives authorization of the ability (or inability) to complete the settlement from the settlement organization 4, and/or legal research provider 3, it transfers this information to a display information section 11, which displays it to a purchaser client 1, and requests final authorization to complete the order (Step 506). If the user or purchaser inputs a desire to complete the transaction, the display information section 11, receives this information, stores it in the basket database 13, and activates the final order processing section 15, which submits the order to the settlement organization 4 (or legal research provider 3), for final settlement (Step 507).

The final order processing section 15, receives confirmation of final settlement and, utilizing the file search section 19, searches the basket database 13, and obtains all information related to the order, including the user or client information, a summary of all selected legal research instruction and specification options, a summary of all selected delivery time and means options, the legal issue to be researched, the final price for each legal research project ordered, and the total final price for all legal research projects ordered. The final order processing section 15, stores all order data and settlement data in an orders database 16, and notifies the legal research provider 3 that an order has been received and/or transfers this information directly to the legal research provider 3, through the Internet Server/CGI for further handling (Step 508).

Although the invention has been described with reference to a particular arrangement of parts, features and the like, these are not intended to exhaust all possible arrangements, and indeed many other modifications and variations will be ascertainable to those of skill in the art.

What is claimed is:

1. A computerized method of automating the assignment, valuation, pricing and purchasing of legal research projects, comprising the steps of:

receiving and storing in an electronic legal research ordering and pricing server standardized primary legal research instructions and specifications that identify essential legal research parameters;

receiving and storing in said electronic legal research ordering and pricing server standardized legal research sub-instructions and sub-specifications;

receiving and storing in said electronic legal research ordering and pricing server specific standardized legal research instructions and specifications;

setting each standardized primary, sub and specific legal research instruction and specification as either a categorical guide or a legal research option that can be selected by a purchaser client;

receiving and storing in said electronic legal research ordering and pricing server a numerical complexity value for each legal research instruction and specification that can be selected by said purchaser client when ordering legal research;

receiving and storing in said electronic legal research ordering and pricing server standardized price ranges that correspond to the said numerical complexity values;

receiving and storing in said electronic legal research ordering and pricing server delivery time and means options that can be selected by a purchaser client and prices for said options;

organizing and displaying said standardized legal research primary, sub and specific instructions and specifications, and delivery time and means options, for viewing and selection by a purchaser client in placing a legal research order;

receiving and storing in said electronic legal research ordering and pricing server the standardized legal research instruction and specification options selected by said purchaser client in placing a legal research order;

receiving and storing in said electronic legal research ordering and pricing server the standardized legal research delivery time and means options selected by said purchaser client in placing a legal research order;

receiving and storing in said electronic legal research ordering and pricing server the legal issue to be researched, as stated by said purchaser client in placing a legal research order;

calculating the total numerical complexity value of the legal research order placed by said purchaser client by totaling the numerical complexity values stored in said electronic legal research ordering and pricing server for each legal research instruction and specification option selected by said purchaser client;

calculating an interim price for the legal research order placed by said purchaser client by identifying the price range stored in said electronic legal research ordering and pricing server that corresponds to the said total numerical complexity value for the legal research order placed by said purchaser client;

calculating the final price of the legal research order placed by said purchaser client by adding to or deducting from said interim price the stored price associated with the delivery time and means options selected by said purchaser client in placing a legal research order;

organizing and displaying a summary of the legal research instruction and specification options and the delivery time and means options selected by said purchaser client, together with the said final price for the legal research order, for viewing, confirmation and purchase by said purchaser client, and settlement through a settlement organization;

organizing and conveying to a legal research provider a summary of the legal research instruction and specification options and the delivery time and means options selected by said purchaser client, together with the said final price for the legal research order and customer and payment information, for use in fulfilling said order.

2. A computerized method of automating the assignment, valuation, pricing and purchasing of legal research projects, as defined in claim 1, further comprising the steps of:

editing said standardized legal research primary, sub and specific instructions and specifications;

editing said setting of legal research categorical guides and legal research options;

editing said setting of numerical values for said legal research options;

editing said setting of corresponding price ranges;

editing said delivery time and means options and prices.

3. A computerized method of automating the assignment, valuation, pricing and purchasing of legal research projects, as defined in claim 1, wherein the standardized primary legal research instructions and specifications are type of analysis, controlling law, forum, sources of law, subject matter and type of research.

4. A computerized method of automating the assignment, valuation, pricing and purchasing of legal research projects, as defined in claim 1, wherein said delivery time and means prices are percentage adjustments made to said price ranges that correspond to the numerical value of selected legal research options, and;

wherein the said final price is reached by making said percentage adjustment to the said interim price based upon the stored and selected delivery time and means percentage adjustments.

5. A computerized method of automating the assignment, valuation, pricing and purchasing of legal research projects, as defined in claim 1, wherein discounts and premiums corresponding to the number and type of orders placed and number and type of services requested are received and stored in said electronic legal research ordering and pricing server, and;

wherein the said final price is further adjusted to reflect said stored discounts and premiums.

6. A computerized method of automating the assignment, valuation, pricing and purchasing of legal research projects, as defined in claim 1, further comprising the steps of:

modifying the legal research order placed by the purchaser client by allowing said purchaser client to select or deselect standardized legal research instruction and specification options;

modifying the legal research order placed by the purchaser client by allowing said purchaser client to select or deselect delivery time and means options;

recalculating the said interim and final prices based upon said modifications made by the purchaser client.

7. A computerized method of automating the assignment, valuation, pricing and purchasing of legal research projects, as defined in claim 1, further comprising the steps of:

accepting and storing more than one legal research order at a time by said purchaser client and calculating a price for the entire order to include the price for all legal research orders placed; accepting and storing the deletion of one or more of several legal research orders by said purchaser client and recalculating the price for the entire order to include the price for all legal research orders placed.

8. A computerized method of automating the assignment, valuation, pricing and purchasing of legal research projects, as defined in claim 1, wherein a settlement organization is not used to complete the transaction (as in the case of direct payment by cash or check or the establishment of an account).

9. A computerized method of automating the assignment, valuation, pricing and purchasing of legal research projects, as defined in claim 1, wherein the legal research project assignment and valuation process takes place without establishing pricing and without purchasing (as with a method for automating the assignment and valuation of legal research projects within a law firm or other organization, where purchasing the legal research is not required, or an overall fee contract for multiple assignments has been established).

* * * * *